United States Patent  [15] 3,648,358
Cannady, Jr. et al.  [45] Mar. 14, 1972

[54] PROCESS FOR TEXTURING THE SURFACE OF HIGH PRESSURE LAMINATES

[72] Inventors: Daniel L. Cannady, Jr., Allendale; Salvatore E. Palazzolo, Hampton, both of S.C.

[73] Assignee: Westinghouse Electric Corporation, Pittsburgh, Pa.

[22] Filed: Oct. 24, 1969

[21] Appl. No.: 869,191

[52] U.S. Cl. ................................29/527.4, 29/625
[51] Int. Cl. ........................B23p 17/00, B23p 25/00
[58] Field of Search ...........................29/527.4, 527.2, 625

[56] References Cited

UNITED STATES PATENTS

| 3,448,516 | 6/1969 | Buck | 29/625 |
| 3,520,052 | 7/1970 | Hoffmann | 29/625 |
| 3,523,039 | 8/1970 | Ramsey | 29/625 |

Primary Examiner—John F. Campbell
Assistant Examiner—Donald P. Rooney
Attorney—F. Shapoe and Alex Mich, Jr.

[57] ABSTRACT

A release-embossing sheet, having a patterned, indented release side and a flat press side, for use in a laminating assembly, is made by embossing a film or foil sheet material to produce patterned indented surfaces, filling the indentations on one side with a resinous composition, and curing the resin.

5 Claims, 2 Drawing Figures

WITNESSES
Theodore F. Wrobel
Daniel P. Cillo

INVENTORS
Daniel L. Cannady, Jr. &
Salvatore E. Palazzolo
BY Alex Mich Jr.
ATTORNEY

PROCESS FOR TEXTURING THE SURFACE OF HIGH PRESSURE LAMINATES

BACKGROUND OF THE INVENTION

This invention relates to a process for making release-embossing sheets and their subsequent use to impart a special embossed design to a high pressure laminate.

Specialty texturing finishes are the current trend in the high pressure laminating industry. To make such finishes, inexpensive, disposable embossing sheets are required. The use of such embossing sheets would be especially advantageous in fabricating wood grained decorative laminates which not only have the look but the rough surface characteristics of real wood.

Prior art methods of making embossing sheets have included etching or machining patterns into the face of metal plates, Olsen in U.S. Pat. No. 2,070,023, and silk screen printing of resinous compositions onto the reverse side of print sheets, the paper backing side of aluminum release sheets, Grosheim in U.S. Pat. No. 3,373,068. These and the variety of other embossing techniques used in the art have various disadvantages. Etched metal plates are expensive and so are not disposable economically. Embossing sheets using raised resin designs, have a tendency for the raised design to flow under pressure.

SUMMARY OF THE INVENTION

Accordingly, it is an object of this invention to provide inexpensive, disposable embossing sheets that will not deform under pressure.

It is a further object of this invention to impart embossed designs to decorative laminates using patterned release sheets as imprinting sheets in high pressure laminating assemblies.

Briefly, my invention accomplishes the foregoing objects by providing an embossing sheet having a patterned, indented metal foil release side and a flat press side. The press side is made flat by filling indentations on that side with a filled resinous composition which provides the strength to resist deformation. This sheet is used as a release-embossing sheet in a laminating assembly, in superimposed relationship, of release-embossing sheet, overlay sheet, print sheet and core stock backing layer. The entire assembly is heat and pressure consolidated and then the release-embossing sheet is removed to provide an embossed surface on the decorative laminate.

The release-embossing sheet is made by indenting patterns on thin metal foil having a paper backing, and then filling in the indentations on the paper backing side with a composition of filler and resin. The resin filler composition provides a flat back surface on the embossing sheet which will allow flush press plate contact in the laminating assembly.

BRIEF DESCRIPTION OF THE DRAWINGS

For a better understanding of the nature and objects of the invention reference is made to the drawings, in which.

DESCRIPTION OF THE PREFERRED EMBODIMENTS

Figure 1:
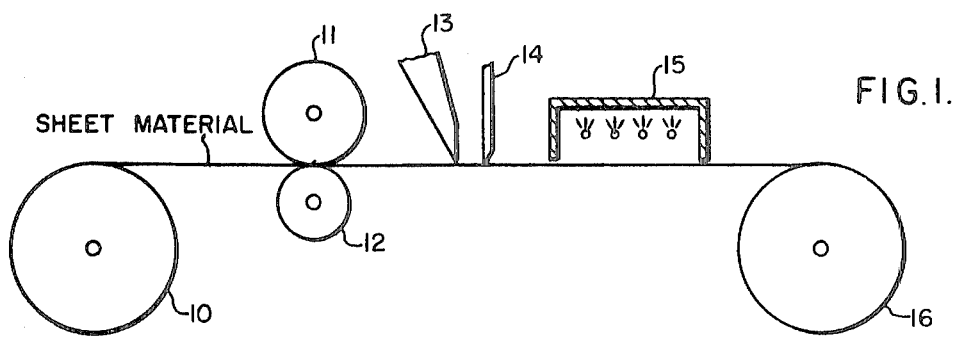
FIG. 1 is a schematic elevation illustrating one method for the continuous fabrication of a release-embossing sheet in accordance with this invention.

Referring now to FIG. 1 of the drawing, a strip of sheet material, in this instance aluminum foil, having a kraft paper backing, from reel 10, is passed between a patterned steel embossing cylinder 11 and a rubber roller 12 which works against the embossing cylinder to press the desired pattern into the foil. Preferably, the aluminum foil contacts the rubber roller and the paper backing contacts the embossing cylinder. The indented foil is then passed under a resin application means 13 and past a blade 14 which removes excess resin from the paper backing to provide a filled in, flat, back press surface. The embossed foil, having the indentations of the paper backing side filled with resin, is then passed through an oven 15 to cure the resin and then onto takeup reel 16.

The sheet material may be any metal foil. The metal foil must be of an optimum thickness, that is, strong enough to resist deformation under pressure when the indentations on the press side are filled with resin, yet not be prohibitively expensive. We have found 0.3 to 4 mil (0.0003 to 0.004 inch) aluminum with a supporting backing of kraft paper, to be the preferred sheet material because it is strong, inexpensive and will cold flow. The metal foil may be used alone but generally will have a kraft paper, pouch stock paper or other backing.

Other sheet materials that may be used include kraft or pouch stock paper coated with a polymeric film, such as regenerated cellulose (cellophane), polyester, polyvinyl chloride or polyvinyl fluoride films. All these films are well known in the art and reference may be made to Brydson, Plastics Materials, D. Van Nostrand, (1966), Chapters 9, 10, 18.4 and 21 for their detailed synthesis. Further reference can also be made to 1968 Modern Plastics Encyclopedia starting pp. 521, 544, 558 and 566.

For continuous fabrication of release embossing sheets, an embossing cylinder is the most efficient means of indenting the metal foil to supply the desired embossed pattern, be it a geometric or wood grain pattern. The rubber roller 12 which presses the sheet material against the embossing cylinder should exert a pressure of between about 40 to 500 p.s.i. Preferably the metal foil surface will have a coating of release agent, as for example, zinc stearate or calcium stearate. Other embossing means can be used in making release-embossing sheets. For example, the sheet material can be embossed by placing it between a flat steel embossing plate and a rubber mat, in a cold press at a pressure between about 40 TO 500 p.s.i.

The resin used to fill the metal foil, or paper backed film or foil, press side indentations, can be applied and removed by any suitable means, so long as the press side of the release embossing sheet is smooth and will fit flushly against the pressure plate of a press when the release-embossing sheet is used in a laminating assembly.

The resins that may be used to fill the indentations on the press side of the embossing sheet are preferably thermoset resins such as for example epoxy (polyglycidyl ether) or polyester resins. These resins may contain curing agents or other suitable ingredients to improve flow and cure characteristics. These preferred resins and their curing agents are well known in the art. Reference may be made to Lee and Neville, Handbook of Epoxy Resins, Chapters 2 and 10, Mc-Graw-Hill, (1967) for epoxy resins and Brydson, Plastics Materials, D. Van Nostrand Chapter 21, (1966) for polyester resins. Any resinous composition, with or without fillers, which will cure to form a hard mass capable of providing support for the sheet material can be used in this invention.

Preferably, fillers are incorporated into the resin composition in the range of between 40 to 80 weight percent. Fillers that can be used include aluminum trihydrate, calcium carbonate, fine river sand, vermiculite, silica or alumina clay and any of a variety of known similar fillers that extend the resin, and supply additional strength.

Figure 2:
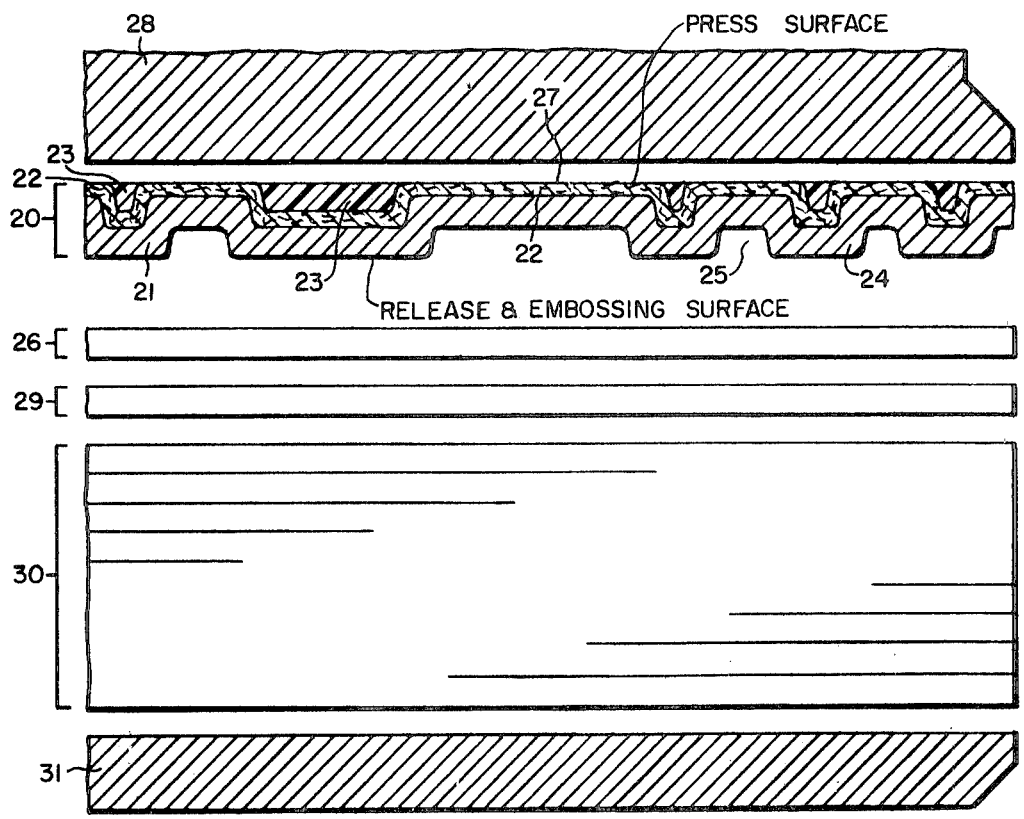
FIG. 2 shows a release-embossing sheet in a high pressure laminating assembly in accordance with this invention.

The resulting product, after curing the resin, can have a structure similar to that schematically shown as 20, in FIG. 2 of the drawings. The release-embossing sheet 20 comprises an embossed sheet material 21, preferably 0.5 mil thick indented aluminum foil coated with zinc stearate release agent, which constitutes the release and embossing surface, backing material 22, and a resinous composition 23, generally but not necessarily containing filler particles. The release-embossing sheet must be constructed so that its release surface contains protrusions 24 and unfilled indentations 25, which will provide the laminate pattern. This release surface is the surface that contacts the overlay sheet 26 in a laminate assembly. The back press side 27 of the release-embossing sheet is made flat by filling the indentations on that side with a resinous composition 23. This flat back side will fit flush against the top press 28 in a laminating assembly. The resinous composition 23 provides strength for the release-embossing sheet to resist deformation during the laminating process. The other layers in the assembly, shown in FIG. 2, are the print sheet 29 and the plurality of core sheets comprising the core stock layer 30. The bottom press 31 is also shown.

In the general manufacture of decorative laminates, it is conventional to prepare an assembly of a plurality of core sheets 30, a decorate sheet 29 positioned immediately above the core sheets, and a protective overlay sheet 26. In the method of my invention, a combination release-embossing sheet is positioned above the overlay sheet, whereupon heat and pressure are applied to consolidate the assembly to a unitary structure after which the release-embossing sheet is removed.

The overlay sheet is a thin sheet of fine paper which has been impregnated with a noble thermosetting resin, such as a melamine formaldehyde resin or other triazine resins, urea-formaldehyde resins, thiourea-formaldehyde resins, unsaturated polyester resins and the like. In selecting the noble resin for the overlay sheet, it is generally preferred to utilize the same resin or substantially the same quality of resin which has been used to impregnate the print sheet. The overlay sheet is not a necessary part of the laminating assembly although it is generally used.

The print sheet usually provides the decorative effect for the laminate. It is usually in the form of a decorative sheet, i.e., dyed, pigmented to impart a solid color or printed with an ornamental design, such as wood or marble grain. It usually comprises a single sheet of high grade absorbent alpha-cellulose or regenerated cellulose paper, impregnated with a substantially completely cured aminotriazine-aldehyde resin, usually a thermoset melamine-formaldehyde resin. Other useful print sheet materials are kraft paper, synthetic fiber paper, cotton, linen, glass fiber fabrics and the like.

In cases where fidelity is important, the imprint caused by the release-embossing sheet of this invention will match the design on the print sheet by positioning the release-embossing sheet in the laminating assembly to substantially register its protrusions with the desired indentations on the print sheet. For example, if the print sheet has a knotted wood grained pattern, the release embossing sheet indentations must match this pattern, so that the finished laminate texturing will match the wood grain.

The rigidity-imparting core stock layer usually comprises a plurality of sheets of kraft paper impregnated with phenolic resin.

The aminotriazine-aldehyde resins used to impregnate the overlay and print sheets are well known in the art and reference may be made to U.S. Pat. No. 3,392,082 for exhaustive details on their production. Similarly, complete details on the phenolic resins used to impregnate the core sheet can be found in U.S. Pat. Nos. 2,205,427; 2,315,087; 2,328,592 and 2,383,430.

The overlay, print sheet and core sheets are impregnated using standard techniques. The print sheet will be impregnated with a solution of aminotriazine-aldehyde resin to give a resin content between 30 and 75 percent by weight, based on the total dry weight of the impregnated sheet and then dried to a stage where the volatile content is between 2 and 10 percent. The core layer sheets are impregnated with a solution of phenolic resin to give a resin content between 20 and 40 percent by weight, based on the total dry weight of the impregnated sheet, and then dried to a stage at which the resin is only partly cured and has a volatile content between 4 and 15 percent.

High pressure laminating techniques are employed in preparing the laminates from the above described assembly of core stock layer of core sheets, print sheet and overlay sheet. Temperature ranging from about 250° F. to about 320° F. and pressures ranging from about 1,000 to 1,500 p.s.i. are employed. The time required, at these temperatures, to effect a cure of the resinous components of the assembly will usually be from about 5 minutes to about 25 minutes. The resulting laminate is generally allowed to cool to about 100° F. before being removed from the press. The release-embossing sheet has a flat back surface to fit flushly against the press or pressing plate and usually an indented, patterned, aluminum combination embossing-release surface, coated with zinc or calcium stearate release agent, in contact with the overlay sheet.

The invention is illustrated by the following example:

EXAMPLE I

A release embossing sheet was first prepared from a steel embossing plate having an etched wood grain pattern. A 12×18-inch sheet of zinc stearate coated 0.5-mil aluminum foil, bonded to kraft paper, was placed between a rubber mat and a steel plate having the desired wood grain pattern. The complete package was placed in a cold press and 300 p.s.i. pressure was applied. The press was closed for about 10–20 seconds - just long enough to result in cold flow of the aluminum and stretching of the paper backing. The steel plate contacted the kraft paper backing.

The resulting embossed, paper backed, aluminum sheet was removed from the plate, placed aluminum release face down, and quick setting, short pot life, methyl-ethyl ketone peroxide cured polyester resin was used to fill the indentation on the paper backing side. The sheets were knife coated so that the resin filled the indentations, and the excess was scraped off to provide a flat back surface. The release embossing sheet was then placed in a 250° F. oven for 30 minutes to cure the resin into a strong infusible mass. The resin is used to help support the embossing sheet and make it strong enough to resist deformation during the laminating process. This sheet was then used in a standard build-up of a high pressure laminate. That build-up is described below.

A roll of 105-lb. kraft paper was treated with a solution of phenol-formaldehyde resin to give a resin content between 30 and 40 percent and then dried to a stage at which the resin was only partly cured and had a volatile content between 6 and 9 percent. Equal size impregnated core sheets, 12×18-in., were cut from the roll and assembled in a stack of seven sheets to form a core stock layer. A layer comprising a 12×18-in. sheet of alpha-cellulose paper having a printed wood grained pattern similar to the aforementioned embossing plate, was impregnated with melamine-formaldehyde resin and superimposed on the stack followed by a melamine-formaldehyde impregnated clear overlay sheet. The melamine-formaldehyde resin content of the print sheet prior to drying was between 35 and 45 percent and after curing, it had a volatile content between 3.5 and 5.0 percent. Finally the release-embossing sheet was placed aluminum face down on top of the overlay sheet and in a manner to properly register its surface with that of the print sheet pattern.

The entire assembly was then placed in a press and molded against a steel pressing plate at 1,000 p.s.i. and 315° F. The maximum internal temperature was about 296° F. The assembly was heated in the press for a total of about 35 minutes. About 20 minutes was required for warm-up after placing the laminate in the press. The laminate was taken from the press and the release texturing sheet removed. A laminate was produced having the desired wood grain texturing. The release embossing sheet did not deform. The indentations in the laminate were correspondingly as deep as the protrusions in the aluminum side of the embossing sheet.

The melamine formaldehyde and phenol formaldehyde impregnating resins used above were prepared as follows:

To 1,620 lb. (20 moles) of a 37 percent formaldehyde solution with a pH adjusted to about 7.5 with sodium hydroxide, was added 1,260 lb. (10 moles) of recrystallized melamine. The slurry pH was adjusted to about 8.2 with 10 percent sodium hydroxide as needed. The mixture was heated to reflux (98°–99° C.) and held at that temperature until a drop or two of the batch when dropped into water at 25° C. formed a cloudy trail as the droplet dispersed throughout the water. At this point the reaction temperature was reduced to about 80° C. and then cooled to 60°–65° C. and the following materials added in order, 200 lb. of ethyl alcohol, 140 lb. of o,p-toluene sulfonamide and 186 lb. of methylglucoside. Mixing was continued to complete solution. Finally 734 lbs. of water was added and the pH adjusted to about 9.1 for saturating the print and overlay paper.

To 940 lb. (10 moles) of molten phenol was added 1,012 lb. (12.5 moles) of 37 percent formaldehyde solution. To this was added a sodium hydroxide solution containing 15 lb. (0.375 mole) of sodium hydroxide flakes dissolved in 30 lb. of water. The mixture was reacted at 98° C. reflux and then diluted with methyl alcohol to a solids content of about 41 percent, determined by a standard procedure of heating the specimen of resin for 2 hours at 170° C. This varnish was used to saturate kraft paper for the core stock of the laminate.

We claim as our invention:

1. A method of making a release-embossing sheet which has a patterned release surface and a flat press surface comprising the steps:
    a. pressing a patterned, indented design into a metal foil having a thickness between about 0.0003 and 0.004 inch to produce patterned indentations on both sides of the metal foil,
    b. filling the indentations on one side of the metal foil with a thermoset resin,
    c. removing excess resin; and
    d. curing the thermoset resin to provide an embossing sheet which has a patterned indented release surface and a flat back press surface.

2. The method of claim 1 wherein the resin is a thermoset resin selected from the group consisting of polyglycidyl ethers and polyester resins.

3. A method of making a release-embossing sheet which has a patterned release surface and a flat press surface comprising the steps:
    a. pressing a patterned, indented design into a sheet material selected from the group consisting of polymeric film and metal foil, said sheet material having a supporting backing, to produce patterned indentations on both sides of the sheet material,
    b. filling the indentations on the supporting backing side of the sheet material with a thermoset resin,
    c. removing excess resin; and
    d. curing the thermoset resin to provide an embossing sheet which has a patterned indented release surface and a flat back press surface.

4. The method of claim 3 wherein the sheet material is aluminum foil having a thickness between about 0.0003 to 0.004 inch, and the supporting backing is paper.

5. The method of claim 4 wherein the resin is a thermoset resin selected from the group consisting of polyglycidyl ethers and polyester resins, the resin contains filler particles and the aluminum foil is coated with a release agent on its release surface.

* * * * *